United States Patent
Fruit et al.

(10) Patent No.: US 8,032,100 B2
(45) Date of Patent: Oct. 4, 2011

(54) SYSTEM AND METHOD OF COMMUNICATING MULTIPLE CARRIER WAVES

(75) Inventors: Larry J. Fruit, Kokomo, IN (US); Mark A. Pollard, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 1029 days.

(21) Appl. No.: 11/824,020

(22) Filed: Jun. 29, 2007

(65) Prior Publication Data

US 2009/0004970 A1    Jan. 1, 2009

(51) Int. Cl.
  *H04B 7/00*   (2006.01)

(52) U.S. Cl. ........... 455/273; 455/137; 455/552.1; 348/725; 348/729; 348/735; 375/339; 375/335; 375/344; 375/349

(58) Field of Classification Search .......... 455/132, 455/137–143, 272–275, 68, 103, 59, 82, 455/83, 146, 147, 278, 500, 152.1; 375/260, 375/273, 323, 335, 338, 339, 342, 344, 349; 348/725, 729, 735
See application file for complete search history.

(56) References Cited

U.S. PATENT DOCUMENTS

| | | | | |
|---|---|---|---|---|
| 4,017,859 A * | 4/1977 | Medwin | ...................... | 342/383 |
| 4,347,627 A * | 8/1982 | Alter | ........................... | 455/136 |
| 4,733,402 A * | 3/1988 | Monsen | ....................... | 375/347 |
| 4,850,037 A * | 7/1989 | Bochmann | ................ | 455/276.1 |
| 5,528,581 A * | 6/1996 | De Bot | ........................... | 370/203 |
| 5,584,051 A * | 12/1996 | Goken | ............................ | 455/68 |
| 5,745,846 A * | 4/1998 | Myer et al. | .................... | 455/209 |
| 5,774,194 A * | 6/1998 | Armbruster | .................. | 348/726 |
| 5,805,108 A * | 9/1998 | Lennen | .................... | 342/357.12 |
| 5,852,651 A * | 12/1998 | Fischer et al. | .............. | 379/56.2 |
| 5,859,874 A * | 1/1999 | Wiedeman et al. | .......... | 375/267 |
| 6,044,254 A * | 3/2000 | Ohta et al. | .................... | 455/272 |
| 6,115,426 A * | 9/2000 | Fujimoto et al. | ............. | 375/260 |
| 6,151,328 A * | 11/2000 | Kwon et al. | .................. | 370/441 |
| 6,285,861 B1 * | 9/2001 | Bonaccorso et al. | ......... | 455/137 |
| 6,944,139 B1 * | 9/2005 | Campanella | ................. | 370/315 |
| 7,623,594 B2 * | 11/2009 | Marrah et al. | ............... | 375/323 |
| RE42,219 E * | 3/2011 | Schilling | ....................... | 375/141 |
| 2003/0021246 A1 * | 1/2003 | Ling | ........................... | 370/334 |
| 2003/0025841 A1 * | 2/2003 | Sawyer | ........................ | 348/734 |
| 2004/0022326 A1 * | 2/2004 | Morrish et al. | .............. | 375/316 |
| 2006/0111056 A1 * | 5/2006 | Dutta | ........................... | 455/103 |
| 2006/0239365 A1 * | 10/2006 | Smallcomb et al. | ......... | 375/260 |
| 2007/0184849 A1 * | 8/2007 | Zheng | ........................ | 455/456.1 |
| 2008/0287163 A1 * | 11/2008 | Skarby et al. | .............. | 455/562.1 |
| 2009/0022231 A1 * | 1/2009 | Ochiai et al. | .................. | 375/260 |

* cited by examiner

*Primary Examiner* — Junpeng Chen
(74) *Attorney, Agent, or Firm* — Jimmy L. Funke

(57) ABSTRACT

A system and method for communicating a plurality of carrier waves that are received by a single receiver system is provided. The receiver system includes at least one antenna, at least one splitter, a plurality of tuners, and at least one combiner. The antenna receives a plurality of carrier waves. The splitter is in communication with the antenna, and splits the plurality of carrier waves. The plurality of tuners are in communication with the at least one splitter, and the split carrier waves are communicated to a separate tuner. The at least one combiner is in communication with the plurality of tuners, and combines an output of the plurality of tuners to generate an output based upon at least a portion of the received plurality of carrier waves.

12 Claims, 3 Drawing Sheets

SYSTEM AND METHOD OF COMMUNICATING MULTIPLE CARRIER WAVES

TECHNICAL FIELD

The present invention generally relates to a system and method of communicating signals, and more particularly, to a system and method for receiving multiple carrier waves.

BACKGROUND OF THE INVENTION

There are a limited number of available frequencies for wirelessly transmitting data, and thus, the frequency bandwidths that are available for communication purposes are also limited. Since additional frequencies cannot be created, which would allow for additional communication, the available frequencies must be efficiently used. In the current European satellite radio systems, there are twenty-three (23) contiguous frequencies designated across forty megahertz (40 MHz), where only seven frequencies are designated for hybrid systems. Generally, hybrid systems include transmissions being broadcast using satellites and terrestrial transponders or terrestrial repeaters. The current European satellite radio system is constrained to frequency bandwidths of 1.712 MHz.

Additionally, the current European satellite radio system is designed to have a pan-European receiving area and individual spot beam receiving areas in and around the pan-European receiving area. Generally, the pan-European and spot beam receiving areas have corresponding terrestrial repeaters. Typically, the signals transmitted to the pan-European and spot beam receiving areas include multiple carrier waves. Generally, a single receiver is needed to receive a single carrier wave, and thus, when multiple carrier waves are transmitted, multiple receivers are typically used.

SUMMARY OF THE INVENTION

According to one aspect of the present invention, a receiver system includes at least one antenna, at least one splitter, a plurality of tuners, and at least one combiner. The at least one antenna receives a plurality of carrier waves. The at least one splitter is in communication with the at least one antenna, and splits the plurality of carrier waves. The plurality of tuners are in communication with the at least one splitter, and the split carrier waves are communicated to a separate tuner. The at least one combiner is in communication with the plurality of tuners, and combines an output of each of the plurality of tuners to generate an output based upon at least a portion of the received plurality of carrier waves.

According to another aspect of the present invention, a receiver system includes a plurality of antennas, a plurality of splitters, a plurality of tuners, at least one combiner, and at least one demodulator. The plurality of antennas receive a plurality of carrier waves, and the plurality of antennas include at least a first antenna configured to receive at least a portion of the plurality of carrier waves that are transmitted as a satellite radio frequency (RF) signal, and a second antenna configured to receive at least a portion of the plurality of carrier waves transmitted as a terrestrial RF signal. The plurality of splitters are in communication with the antennas, and separate the plurality of carrier waves. The plurality of tuners are in communication with the splitters, and each of the separated carrier waves is communicated to a separate tuner. The at least one combiner is in communication with the tuners, and combines an output of the tuners. The at least one demodulator is in communication with the combiner and demodulates an output of the combiner to generate an output based upon at least a portion of the received plurality of carrier waves.

According to yet another aspect of the present invention, a method of communicating the plurality of carrier waves that are received by a single receiver system includes the steps of transmitting the plurality of carrier waves, and receiving the plurality of carrier waves by a single receiver. The method further includes the steps of splitting the plurality of carrier waves, receiving a carrier wave by each of the plurality of tuners, down-converting a frequency of each of the separated carrier waves to a lower frequency by a plurality of tuners, and combining an output of each of the plurality of tuners to generate an output based upon at least a portion of the received plurality of carrier waves.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
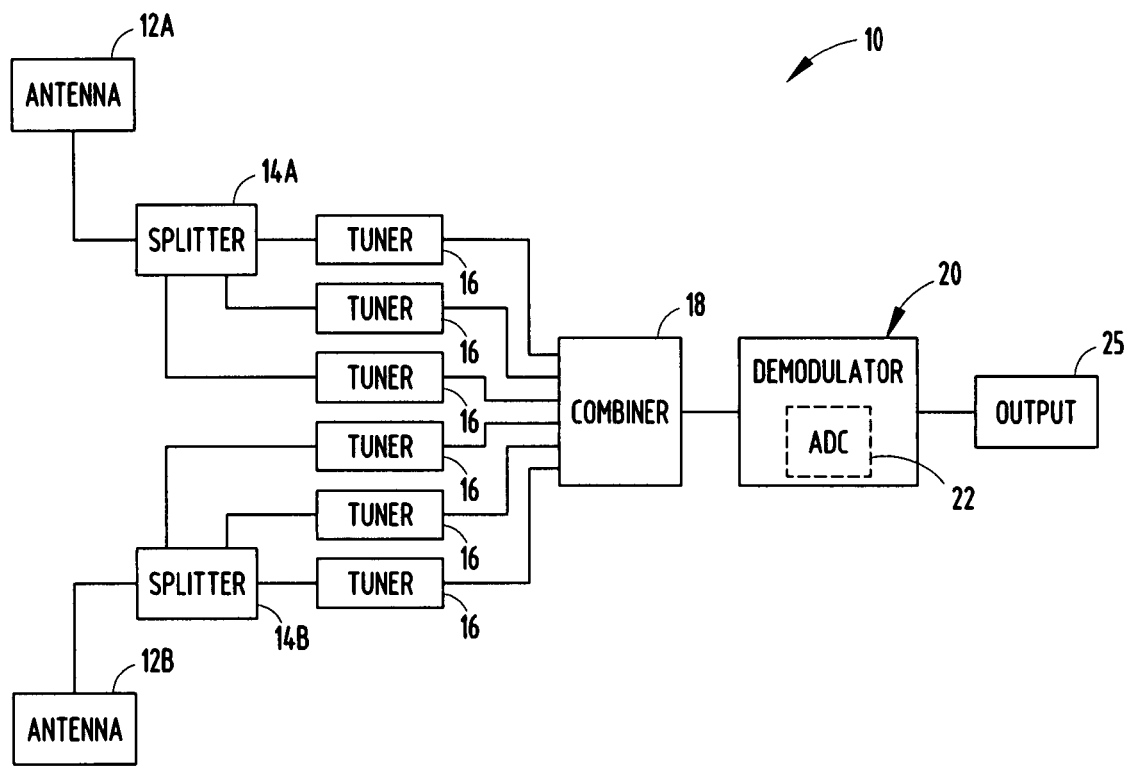
FIG. 1 is a block diagram of a receiver system in accordance with one embodiment of the present invention.
Figure 2:
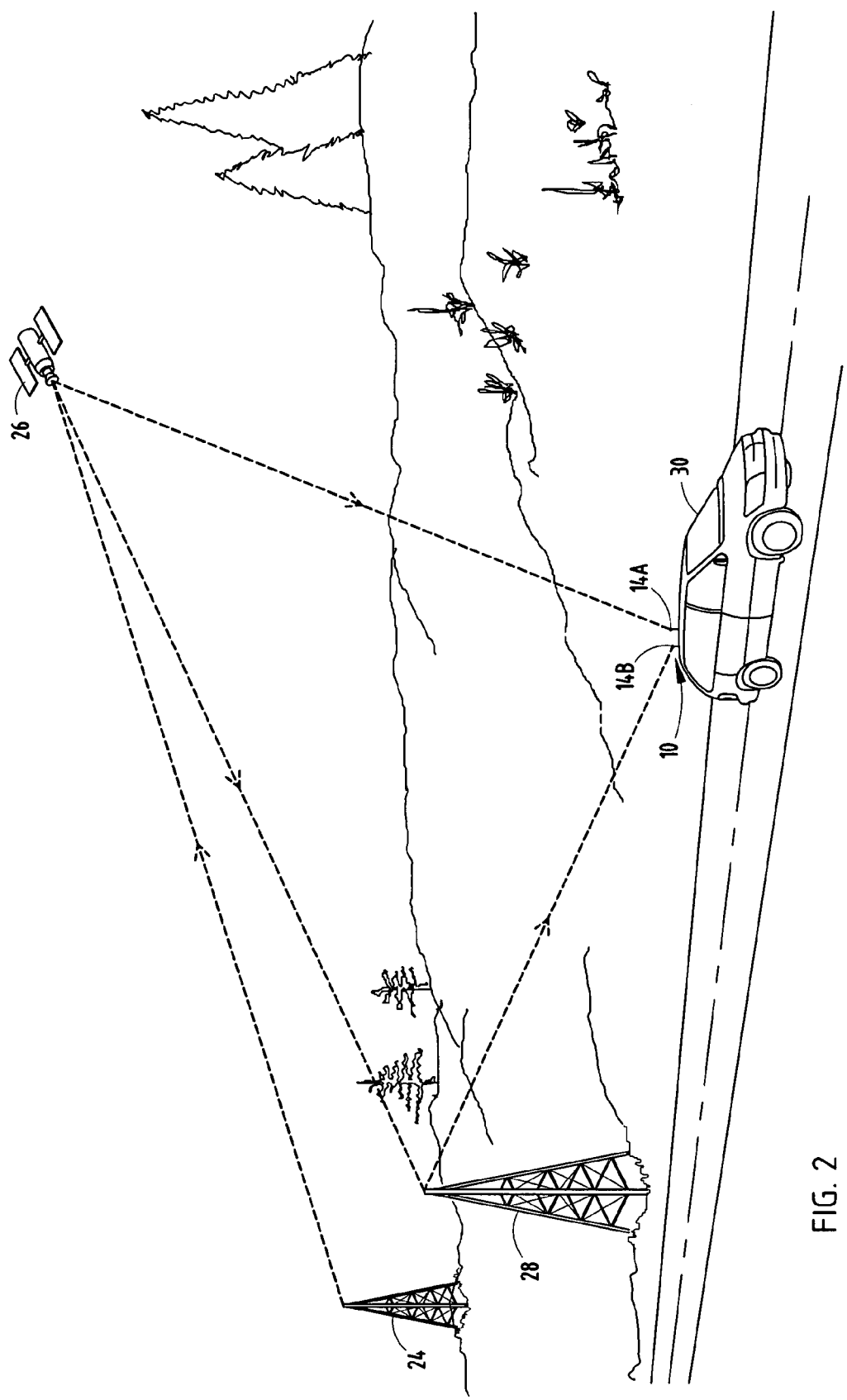
FIG. 2 is an environmental view of a receiver system in accordance with one embodiment of the present invention.

In reference to both FIGS. 1 and 2, a receiver system is generally shown at reference identifier 10. The receiver system 10 includes at least one antenna that receives a plurality of carrier waves. According to one embodiment, the at least one antenna includes a first antenna 12A and a second antenna 12B, where the first and second antennas 12A, 12B are configured to receive different types of signals, as described in greater detail below. In an alternate embodiment, a single antenna may be employed to receive the plurality of carrier waves. The receiver system 10 also includes at least one splitter that is in communication with the antennas 12A, 12B, and splits the received plurality of carrier waves. A first splitter 14A is in communication with the first antenna 12A, and a second splitter 14B is in communication with the second antenna 12B.

Additionally, the receiver system 10 includes a plurality of tuners 16 that are in communication with the first and second splitters 14A, 14B, such that the split carrier waves are transmitted to a separate tuner 16. According to one embodiment, the tuners 16 are configured to separate the plurality of carrier waves, such that each tuner 16 processes only one carrier wave at a particular frequency. The receiver system 10 further includes at least one combiner 18 that is in communication with the tuners 16, and combines an output of each of the tuners 16. The receiver system 10 can also include a demodulator generally indicated at 20 that is in communication with the combiner 18 for demodulating the combined output of the combiner 18. The demodulator 20 can further include at least one analog-to-digital converter (ADC) 22 for converting the combined analog output of the combiner 18. The receiver system 10 emits an output 25 based upon the combined and demodulated signals. Thus, the output 25 is based upon at least a portion of the received plurality of carrier waves.

Typically, the first antenna 12A is configured to receive the plurality of carrier waves that are transmitted as a satellite radio frequency (RF) signal, and the second antenna 12B is configured to receive the plurality of carrier waves that are transmitted as terrestrial RF signals. As shown in FIG. 2, a transmitter 24 transmits or uplinks the satellite RF signal to a satellite 26. The satellite 26 then re-transmits or downlinks the satellite RF signal to the receiver system 10, which is shown located onboard a vehicle 30. Additionally, the terrestrial repeater 28 receives the satellite RF signal from the satellite 24, and re-transmits the signal as a terrestrial RF signal. In one embodiment, the first antenna 12A receives the satellite RF signal transmitted from the satellite 26, and the second antenna 12B receives the terrestrial RF signal transmitted by the terrestrial repeater 28. According to a disclosed embodiment, the satellite 26 is a highly elliptical orbit (HEO) satellite. It should be appreciated by those skilled in the art that more than one satellite and terrestrial repeaters may communicate signals to the receiver system 10.

The signal received by the first antenna 12A is then communicated or transmitted to the first splitter 14A, and the signal received by the second antenna 12B is communicated or transmitted to the second splitter 14B. The first and second splitters 14A, 14B split the plurality of carrier waves. It should be appreciated by those skilled in the art that any number of antennas and splitters can be used based upon the different types of signals being used to transmit the carrier waves. The plurality of split carrier waves are transmitted to the plurality of tuners 16, such that each tuner 16 in communication with a splitter 14A, 14B receives all of the carrier waves received by the splitters 14A, 14B.

According to a disclosed embodiment, each tuner 16 filters different frequencies. Thus, a first tuner in communication with the second antenna 12B and the second splitter 14B can receive carrier waves at 1460 MHz and 1465 MHz, and a second tuner in communication with the second antenna 12B and second splitter 14B can filter the 1465 MHz to only process the 1460 MHz signal, and filter the 1460 MHz signal. Typically, the separate tuners 16 down-convert the frequency of the separated carrier wave, or the carrier wave that is not filtered, so that an output of the tuner 16 is at a lower frequency than the inputted separated carrier wave, as described in greater detail herein. It should further be appreciated by those skilled in the art that any number of tuners 16 can be used based upon the number of carrier waves that are being received by the receiver system 10. According to an alternate embodiment, the first and second splitters 14A, 14B filter the carrier waves based upon which carrier wave is being communicated to each tuner 16.

The output of each individual tuner 16 is then transmitted or communicated to the combiner 18. The combiner 18 combines the output from each tuner 16, and transmits a combined output to the demodulator 20. The demodulator 20 then demodulates the combined output of the combiner 18 in order to produce an audio and/or video output. It should be appreciated by those skilled in the art that the demodulator 20 can also include any other desirable signal processing devices in order to produce the audio and/or video output 25.

Figure 3:
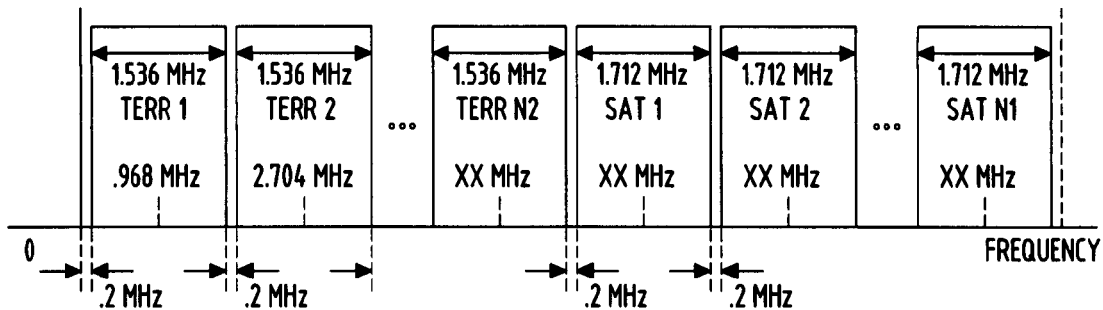
FIG. 3 is a graph illustrating the down-conversion of a frequency of carrier waves in accordance with one embodiment of the present invention.

In reference to FIGS. 1-3, by way of explanation and not limitation, the receiver system 10 is configured to receive signals within the L-band frequency spectrum that typically ranges from 1450 MHz to 1490 MHz in one example. Thus, the receiver system 10 front end can be configured to receive the entire L-band frequencies of interest. In the current European satellite radio system, the signal transmitted to the spot beam receiving areas includes two carrier waves, and the signal transmitted to the pan-European receiving area includes four carrier waves. Further, in the current European satellite radio system, the satellite RF signals are transmitted in a 1.712 MHz band, and the terrestrial RF signals are transmitted in a 1.536 MHz band. Typically, each tuner 16 is tuned to any of the possible L-band frequencies, and each tuner 16 has an RF local oscillator (LO) frequency that is selected in order to provide a common first intermediate frequency (IF) among the tuners 16. According to a disclosed embodiment, the IF of a tuner 16 configured to receive a satellite signal from the first antenna 12A is 114.745 MHz and has an IF LO frequency of 115.713 MHz, and a second tuner 16 in communication with the first antenna 12A has an IF LO frequency of 117.499 MHz. By having a common first IF, the individual tuners 16 can have similar components, and thus, are not designed for specific frequencies.

As shown in FIG. 3, the IF frequency is selected to provide the IF LO frequency. Thus, the satellite RF signals and terrestrial RF signals are down-converted by the tuners 16 to a lower frequency in order for the signal to fit within the baseband of the receiver system 10. The lower frequency allows for the signal to be communicated within the receiver system 10, and processed to produce the audio and/or video output 25. According to a disclosed embodiment, a tuner 16 in communication with the second antenna 12B and receives a terrestrial RF signal has an IF of 0.968 MHz, and a second tuner 16 in communication with the second antenna 12B has an IF of 2.704 MHz, where the signals communicated to both tuners 16 have a bandwidth of 1.536 MHz. Further, the bandwidth of the second IF LO frequency signal is typically within the sampling rate of the single ADC 22, such that only one ADC 22 is needed. However, it should be appreciated by those skilled in the art that more than one ADC can be used. Thus, the receiver system 10 can receive signals within a spot beam receiving area, receive signals within the pan-European receiving area, detect signals within a spot beam receiving area, or a combination thereof.

Figure 4:
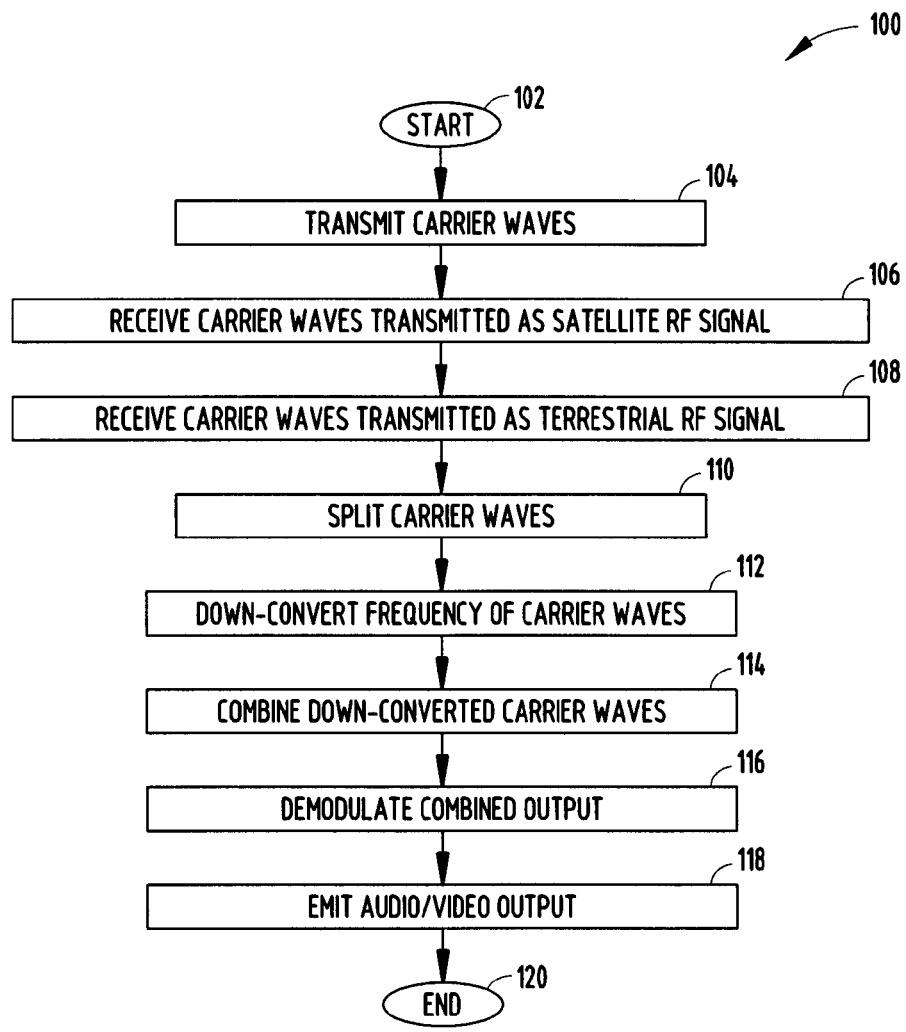
FIG. 4 is a flow chart illustrating a method of communicating a plurality of carrier waves that are received by a single receiver system in accordance with one embodiment of the present invention.

With particular reference to FIGS. 1-2 and 4, a method of communicating a plurality of carrier waves that are received by a single receiver system 10 is generally shown in FIG. 4 at reference identifier 100. The method 100 starts at step 102, and transmits the plurality of carrier waves by the transmitter 24 at step 104. The carrier waves that are transmitted as satellite RF signals are received by the first antenna 12A at step 106. At step 108, the carrier waves that are transmitted as terrestrial RF signals are received by the second antenna 12B. Thus, the terrestrial repeater 28 receives a satellite RF signal from the satellite 26, and re-transmits the signal as a terrestrial RF signal that is received by the second antenna 12B.

The method 100 then proceeds to step 110, where the received carrier waves are split by the first and second splitters 14A, 14B. Each of the tuners 16 receives the desired carrier wave, with which the tuner 16 is configured to receive, and down-converts the frequency of the carrier waves at step 112. At step 114, the combiner 18 combines the down-converted carrier waves that are outputted by the separate tuners 16. The demodulator 20 demodulates the combined output of the combiner 18 at step 116. The demodulator 20 then emits the audio and/or video output 25 at step 118, and the method 100 ends at step 120.

By way of explanation and not limitation, the receiver system 10 can be located on a vehicle 30, as shown in FIG. 2. As the vehicle 30 is mobile, the receiver system 10 can detect the signals being transmitted in a spot beam area. Further, the vehicle 30 needs only a single receiver system 10 to receive a plurality of carrier waves. However, it should be appreciated that the receiver system 10 can be used on mobile devices that are not used with the vehicle 10 and can be employed on stationary devices.

Advantageously, the single receiver system 10 and method 100 allow for a plurality of carrier waves to be received without requiring multiple receivers, where a single receiver is needed for each carrier wave. Thus, in the current European satellite radio system, for example, where multiple carrier waves are being used in the spot beam and pan-European receiving areas, one would have to have multiple receivers for each of the carrier waves. Further, by combining the output with the combiner 18, only a single ADC 22 is required, and thus, being more economical than if multiple ADCs were used. Additionally, having the first antenna 12A and second antenna 12B being configured to receive different types of signals, the receiver system 10 can locate multiple types of signals, such as satellite RF signals and terrestrial RF signals, with which can be received.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A receiver system, comprising:
a first antenna configured to receive a plurality of satellite radio frequency (RF) carrier waves;
a second antenna configured to receive a plurality of terrestrial RF carrier waves;
a first splitter in communication with said first antenna, said first splitter adapted to generate and output a plurality of single split satellite RF carrier waves from the received satellite RF carrier waves;
a second splitter in communication with said second antenna, said second splitter adapted to generate and output a plurality of single split terrestrial RF carrier waves from the received terrestrial RF carrier waves;
a first plurality of tuners in communication with said first splitter, with each tuner in the first plurality of tuners including at least one intermediate frequency (IF) signal, each tuner in the first plurality of tuners is configured to process a single split satellite RF carrier wave and produce an output with a different carrier frequency than said single split satellite RF carrier wave; and
a second plurality of tuners in communication with said second splitter, with each tuner in the second plurality of tuners including at least one intermediate frequency (IF) signal, each tuner in the second plurality of tuners is configured to process a single split terrestrial RF carrier wave and produce an output with a different carrier frequency than said single split terrestrial RF carrier wave.

2. The receiver system of claim 1, wherein a combiner is in communication with each tuner in said first and said second plurality of tuners, wherein said combiner combines the output from each tuner in said first and said second plurality of tuners to generate a combined output based upon at least a portion of said plurality of satellite RF and said plurality of terrestrial RF carrier waves.

3. The receiver system of claim 2 further including,
at least one demodulator being in communication with said combiner, wherein said at least one demodulator demodulates the combined output from said combiner.

4. The receiver system of claim 3, wherein said at least one demodulator comprises at least one analog-to-digital converter (ADC).

5. The receiver system of claim 4, wherein the output of each tuner in the first and the second plurality of tuners has a different IF frequency from the output of every other tuner in the first and the second plurality of tuners, and the respective IF frequencies of the tuners in the first and the second plurality of tuners is within a sample rate of the at least one ADC, and said at least one ADC is in electrical communication with each of the respective tuners of the first and the second plurality of tuners.

6. The receiver system of claim 1, wherein each tuner in said first and said second plurality of tuners down-converts a frequency of each of said single split carrier frequency wave associated with each tuner in said first and said second plurality of tuners such that said respective output of each tuner in said first and said second plurality of tuners is at a lower frequency than said single split carrier frequency wave input to each tuner in said first and said second plurality of tuners.

7. The receiver system of claim 1, wherein said first and said second plurality of tuners include two to six tuners and each respective tuner in the first and the second plurality of tuners is adapted to receive different frequencies from every other tuner in the first and the second plurality of tuners.

8. The receiver system of claim 1, wherein said receiver system is located on a vehicle.

9. The receiver system of claim 1, wherein the first plurality of tuners comprises three distinct tuners and the second plurality of tuners comprises three distinct tuners.

10. The receiver system of claim 1, wherein the first splitter filters out a separated satellite RF carrier wave from the plurality of satellite RF carrier waves to further configure said separated satellite RF carrier wave that are output from the first splitter to each tuner in the first plurality of tuners.

11. The receiver system of claim 1, wherein the second splitter filters out a separated terrestrial RF carrier wave from the plurality of terrestrial RF carrier waves to further configure said separated terrestrial RF carrier wave that are output from the second splitter to each tuner in the second plurality of tuners.

12. The receiver system of claim 1, wherein each tuner in said first and said second plurality of tuners has said at least one IF signal with the at least one IF signal having a common first intermediate frequency.

\* \* \* \* \*